UNITED STATES PATENT OFFICE.

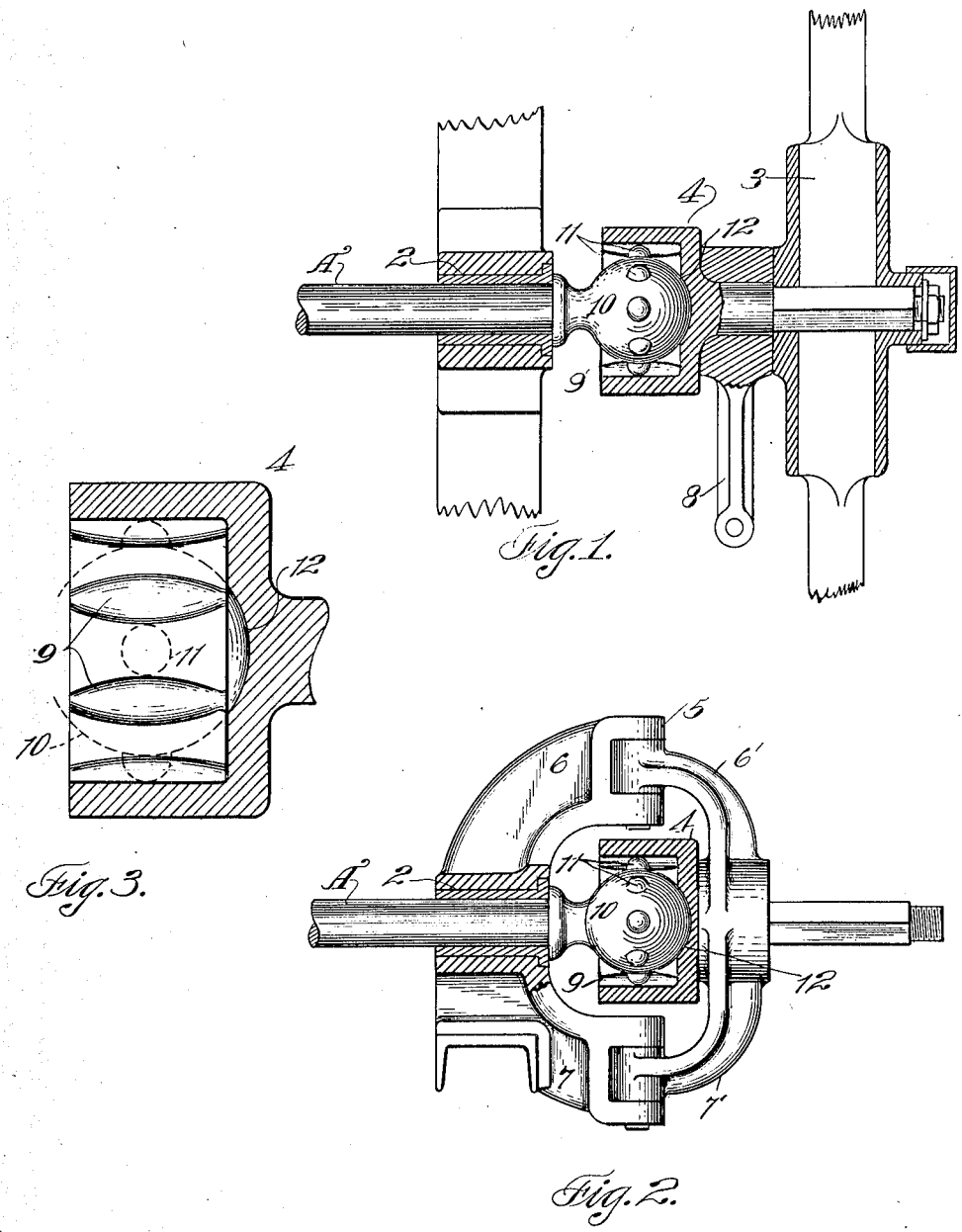

CARL ATKINS, OF SAN FRANCISCO, CALIFORNIA.

DRIVE-SHAFT CONNECTION.

No. 870,923. Specification of Letters Patent. Patented Nov. 12, 1907.

Application filed March 12, 1907. Serial No. 361,952.

*To all whom it may concern:*

Be it known that I, CARL ATKINS, a citizen of the United States, residing in the city and county of San Francisco and State of California, have invented new and useful Improvements in Drive-Shaft Connections, of which the following is a specification.

My invention relates to shaft driving connections for use wherever one rotary part is to be connected to another rotary part, so that the two parts may be turned at different angles to one another without interfering with the rotative motion of either. Its object is to provide a simple, practical, universal joint-drive which will be strong, flexible, and not liable to bind, and which shall be particularly applicable for use in automobiles. Its special object is to provide a practical front axle-drive for self-propelled vehicles.

As is well known the front axle of automobiles is generally stationary and the front wheels are mounted to turn on the ends of the axle by suitable connections with the steering gear. I purpose mounting the front axle for rotation and applying my invention to connect this axle with the wheel hubs, so that the front wheels will be positively driven without interfering in any way with the steering movements from side to side of these wheels.

Having reference to the accompanying drawings,— Figure 1 is a horizontal section through the wheel hub. Fig. 2 is a vertical section of same, with parts in elevation. Fig. 3 is a diagrammatic view showing the curved teeth.

A represents a shaft suitably mounted for rotation and driven from any appropriate source of power. In the present invention this shaft presumably represents the front axle of an automobile and is turnable in suitable boxes as 2 on the vehicle frame.

3 is a wheel having a hollow hub 4 and hung on the vertical pivots 5 to swing properly for steering purposes in the manner well known in the art. As shown the pivots 5 are formed on the respective upper and lower pairs of brackets 6—6'—7—7', and a lateral arm 8 is fixed to the hub, and connects with the steering gear which it is not necessary to show.

The invention resides in the construction of the hub 4 and its connection with shaft A. The inside of the hub is provided with an internal gear 9, the teeth of which are convexed from end to end on their wearing surfaces. This hub with its internal gear forms a female or socket.member for the reception of a corresponding male or ball member 10 on drive-shaft A. The ball 10 is provided with pin teeth 11 meshing the internal gear 9, and the inner end of the ball member 10 seats and turns in a corresponding concavity 12 in the bottom of the socket in the hub 4. The size and arrangement of the parts are such that the ball 10 will have a true universal ball and socket movement in its socket in the hub, and at the same time the teeth 11 will always remain in proper mesh with the internal gear 9.

The tapering of the teeth of the gear 9 at each end in the manner shown and described is desirable, if not essential for the proper movement of the parts, and to prevent binding or unnecessary grinding of the gears. By tapering both ends of the teeth of gear 9 the teeth 11 on the driving part 10 are accommodated without any binding friction of the parts when the wheel is turned in steering. Although I have shown only one wheel and one end of the axle with this universal drive-joint, it is understood that the other wheel and the other end of the axle may be similarly equipped.

While I have described the invention as particularly applicable to a front wheel drive for automobiles, it is manifest that it is capable of a variety of other uses and in a variety of other forms of transmission.

Having thus described my invention, what I claim and desire to secure by Letters Patent, is—

1. The combination of a socket-member having an internal gear, the teeth of which are convexed from end to end in a direction substantially parallel with the axis of said member and a drive-member provided with pin-teeth to engage said gear and turnable to carry its axis into and out of line with the axis of said socket-member without interfering with the driving functions.

2. In a transmission mechanism, a universal-joint comprising a socket-member having an internal-gear, the teeth of which are convexed on their wearing surfaces in a direction substantially parallel with the axis of said socket member, a ball fitting said socket and having pin-teeth engaging the teeth of said internal-gear.

In testimony whereof I have hereunto set my hand in presence of two subscribing witnesses.

CARL ATKINS.

Witnesses:
FREDERICK E. MAYNARD.
S. H. NOURSE,